No. 865,498. PATENTED SEPT. 10, 1907.
D. M. KENYON.
IMPLEMENT FOR COUPLING PIPE.
APPLICATION FILED APR. 27, 1906.

2 SHEETS—SHEET 1.

WITNESSES
Everett N. Curtis
K. M. Sullivan

INVENTOR
Daniel M. Kenyon
by Chas. F. Perkins his Attorney

No. 865,498. PATENTED SEPT. 10, 1907.
D. M. KENYON.
IMPLEMENT FOR COUPLING PIPE.
APPLICATION FILED APR. 27, 1906.

2 SHEETS—SHEET 2.

WITNESSES
Everett E. Guthrie
K. M. Sullivan

INVENTOR
Daniel M. Kenyon
by Chas. F. Perkins his Attorney

UNITED STATES PATENT OFFICE.

DANIEL M. KENYON, OF BRADFORD, PENNSYLVANIA, ASSIGNOR OF ONE-HALF TO JAMES B. ETHERINGTON, OF BRADFORD, PENNSYLVANIA.

IMPLEMENT FOR COUPLING PIPE.

No. 865,498.                Specification of Letters Patent.        Patented Sept. 10, 1907.

Application filed April 27, 1906. Serial No. 313,908.

*To all whom it may concern:*

Be it known that I, DANIEL M. KENYON, a citizen of the United States, residing at Bradford, in the county of McKean and State of Pennsylvania, have invented new and useful Improvements in Implements for Coupling Pipes, of which the following is a specification.

My invention relates to a tool or implement for inserting sections of pipe into couplings; and the object of my invention is to provide a practical means for installing a pipe system without injuring the packing.

My invention primarily consists in constructing a tool which, when inserted in the end of one pipe member, will compress the packing so as to admit of the insertion of another pipe member, the said packing ordinarily being an annular ring of compressible material whose interior diameter is smaller than that of the pipe to be inserted in the coupling.

My invention further consists in the various details of construction and improvements hereinafter specifically described and claimed.

Reference is hereby made to the accompanying drawing in which similar numerals of designation refer to similar parts throughout the several views.

Figure 1:
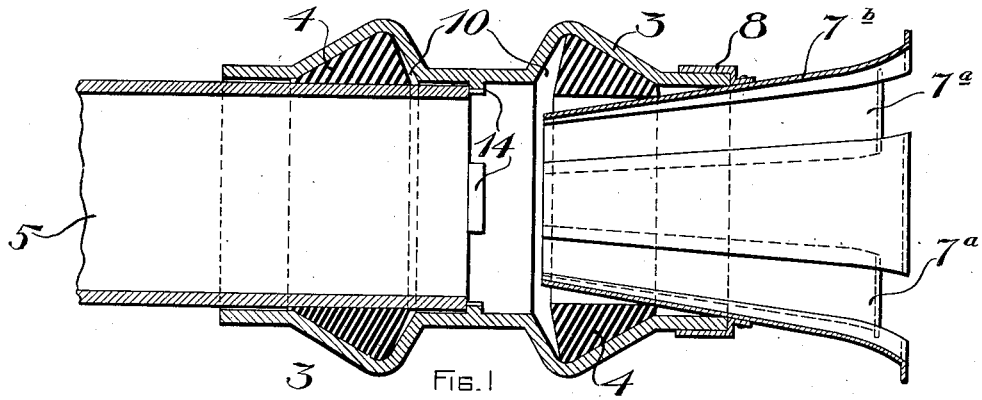
Figure 2:
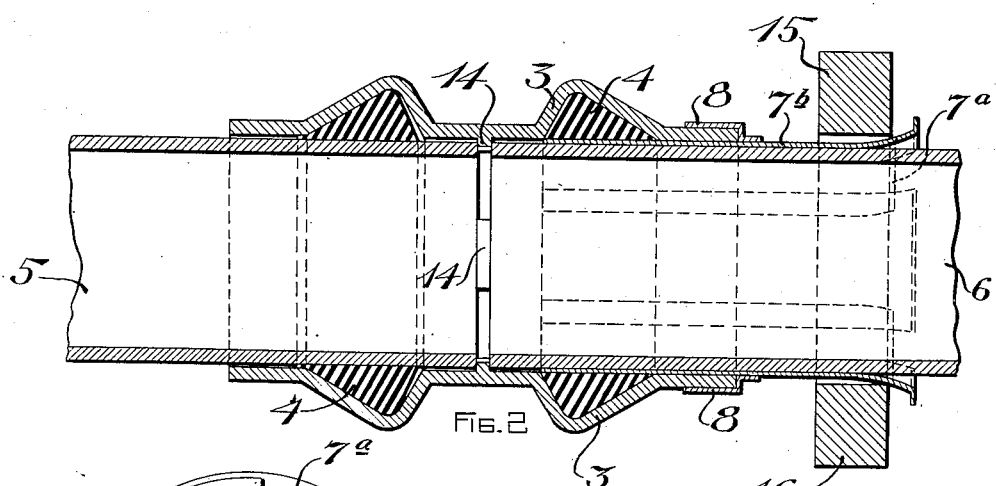
Figures 3, 4:
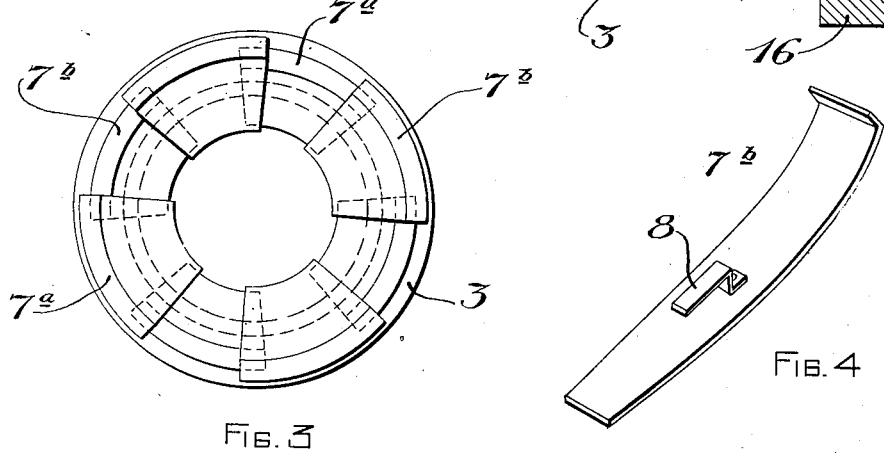
Figure 5:
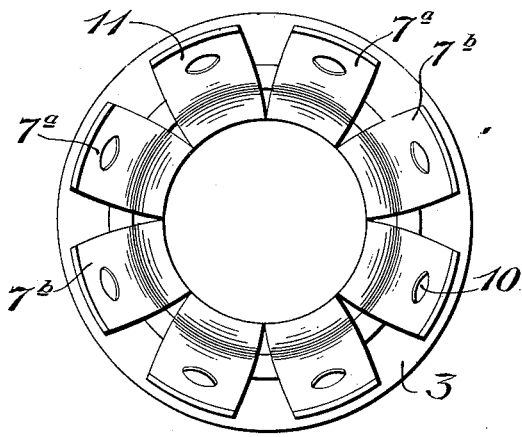
Figure 6:
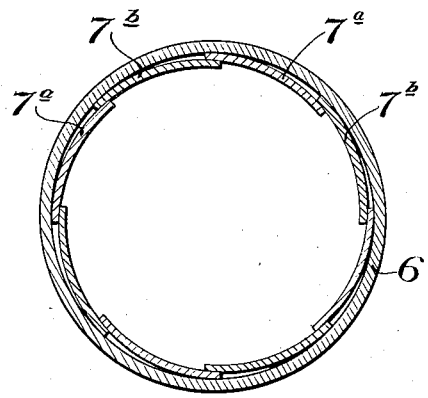
Figure 7:
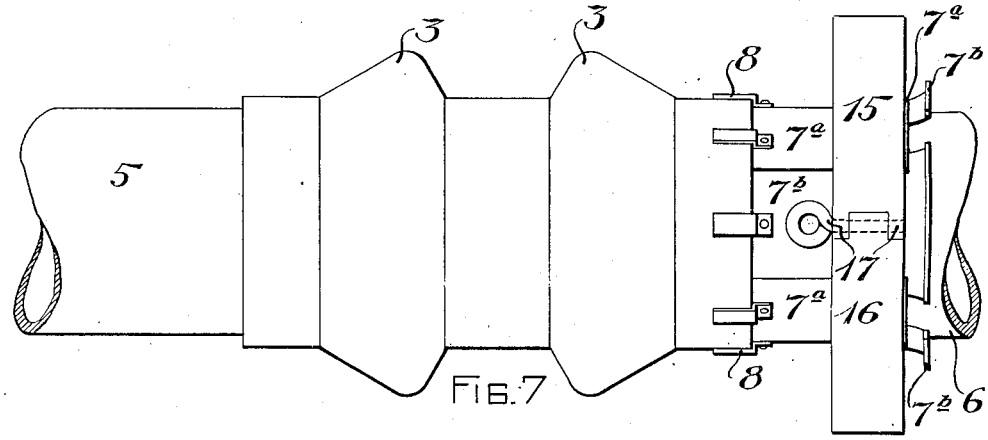
Figure 8:
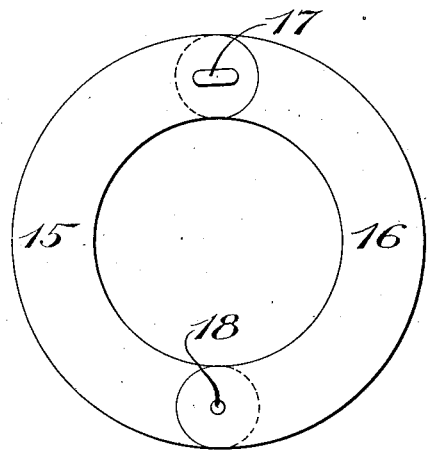

Figure 1 is a longitudinal section of the coupling, pipe and packing, showing my improved tool or implement used for applying the coupling. Fig. 2 is a longitudinal section of the coupling, packing and pipe, showing the position of my improved inserting implement or strips after the coupling has been applied and before the said strips have been withdrawn, and also showing the position of the collar used for effecting such withdrawal. Fig. 3 is an end elevation of the coupling and the inserting implement or strips shown in Fig. 1. Fig. 4 is a perspective view of one of the inserting strips. Fig. 5 is an end elevation of the coupling, showing a modification of the position of the inserting strips. Fig. 6 is a cross section of the end of the coupling showing a modification of my tool or implement in which the adjacent edges of the strips are shown to overlap. Fig. 7 is a plan view of the coupling, packing, pipe, implement and collar shown in Fig. 2. Fig. 8 is an end elevation, looking in the direction of the arrow, of the collar used for removing the inserting implement or strips from the coupling and pipe.

Referring to the drawings, 3 indicates one pipe member, shown as a coupling of metal or other suitable material having on the interior thereof annular recesses 10 adapted to receive and retain rings of compressible material. The section 5 or the section 6 constitutes the other pipe member to be joined to the member 3. The packing ring 4 is preferably so formed that before being compressed it is sufficiently thicker than the width of the space between the opposing walls of the members to be coupled, to prevent the assembling of such members solely by the insertion of one member within the other. The said sections of pipe 5 and 6 are usually of iron or steel but may be of any other suitable material.

In Fig. 1 is shown one section of pipe 5 already inserted in the coupling, the other end of the coupling being shown with the strips 7ª and 7ᵇ in position for the insertion of the other section of pipe 6. Preferably each of said strips 7ª and 7ᵇ bears thereon the spring 8 which is attached to it in any approved manner; the object of said spring 8 being to grip the edge of the coupling and to retain the strips 7ª and 7ᵇ in position while the pipe 6 is being inserted. The spring 8 may also be stamped or pressed out of the body of the strips. It is, however, not essential to use the said spring at all as it is obvious that the strips may be held in place by the hand or other means. Each of said strips 7ª and 7ᵇ is a thin strip of metal or other suitable material which is curvilinear in cross section and is adapted to be readily introduced in the coupling in such a manner as to be easily removed after the section of pipe has been inserted, there being sufficient space between the exterior surface of said pipe or conduit and the interior surface of said coupling to permit this operation. The strips 7ª are first inserted into the coupling and afterwards the strips 7ᵇ so that the edges of the latter overlap the edges of the former as shown in Fig. 3. Preferably each of said strips 7ª and 7ᵇ tapers toward one end thereof, a small portion of the other end being turned up at right angles thereto for the purpose of engaging with the collar shown in Figs. 2, 7 and 8. It is obvious that the said strips may be inserted in various ways into the coupling. In Fig. 5, I have shown them inserted edge to edge so that when the pipe is installed they completely surround the same and at the same time press back the packing. In Fig. 6, I have shown the said strips overlapping each other at their adjacent edges.

I have found in practice that it is desirable, though not essential, to have the edges of the strips overlap, so that by no accident could the strips be spread so as to allow the packing when compressed to protrude between their edges and be sheared off by the edge of the pipe. In such case grooves would be formed on the inner surface of the packing and would not afford as tight a joint as a perfectly smooth surface.

I also found it desirable to construct the strips 7ª and 7ᵇ of different lengths in order that the same may be more readily removed from the coupling by the collar shown in Fig. 8 or other well known devices. The said collar is formed by two semi-circular sections 15 and 16, which are pivoted at 18, and at the point 17 are furnished with a latch, ring bolt, or other securing device. The said collar is clamped around the strips 7ª and 7ᵇ in the manner shown in Figs. 2 and 7. By moving it to the right, it first engages the turned up portion of each of the strips 7ª, and these are moved in the same direction until the said collar engages the turned up portions of each of the strips 7ᵇ, when all of the strips then start together. I find it advisable to use this method of removal as it is obvious that the strips may be started more easily thereby, and the strain of withdrawal more easily overcome, than when they are all moved at the same time.

While I have shown the strips in two lengths, I do not desire to be limited to the use of but two sizes of the strips, as it is apparent that I could use varying lengths of said strips with good results.

It is also apparent that it is not essential to have the strips curvilinear in cross section, as flat strips or strips of various forms may be used to good advantage. Generally, any form of strip would serve the purpose of my invention, provided that a plurality of the strips when inserted in the coupling would be capable of compressing the packing.

What I claim and desire to secure by Letters Patent is:—

1. An implement for coupling pipe containing compressible packing, consisting of a plurality of strips adapted to be inserted between the packing and the contiguous pipe wall to compress said packing, to permit the two pipe members to be assembled, said strips being also adapted to project from the joint to enable them to be withdrawn after the members are assembled.

2. An implement for coupling pipe containing compressible packing, consisting of a plurality of longitudinally curved strips adapted to be inserted between the packing and the contiguous pipe wall to compress said packing to permit the two pipe members to be assembled, said strips being also adapted to project from the joint to enable them to be withdrawn after the members are assembled.

3. An implement for coupling pipe containing compressible packing, consisting of a plurality of strips adapted to be inserted between the packing and the contiguous pipe wall to compress said packing to permit the two pipe members to be assembled, combined with means for holding said strips in place when the pipe is inserted, said strips being also adapted to project from the joint to enable them to be withdrawn after the members are assembled.

4. An implement for coupling pipe containing compressible packing, consisting of a plurality of longitudinally curved strips adapted to be inserted between the packing and the contiguous pipe wall to compress said packing to permit the two pipe members to be assembled, combined with means for holding said strips in place when the pipe is inserted, said strips being also adapted to project from the joint to enable them to be withdrawn after the members are assembled.

5. An implement for coupling pipe containing compressible packing, consisting of a number of longitudinally curved strips adapted to be inserted within the packing ring and to compress said packing into its recess to permit the introduction of the pipe into the packing ring, combined with a resilient finger attached to each of said strips and constructed to engage the outer edge of said coupling and to hold the said strips in place.

6. An implement for coupling pipe containing compressible packing, consisting of a number of longitudinally curved strips adapted to be inserted within the packing ring and to compress said packing into its recess to permit the introduction of the pipe into the packing ring, combined with a resilient finger attached to each of said strips and constructed to engage the outer edge of said coupling and to hold the said strips in place and means for readily removing said strips after the pipe is inserted.

7. An implement for coupling pipe containing compressible packing, consisting of a plurality of strips adapted to be inserted between the packing and the contiguous pipe wall to compress said packing to permit the two pipe members to be assembled, each of said strips having a small portion of one end thereof turned at an angle to the same.

8. An implement for coupling pipe containing compressible packing, consisting of a plurality of longitudinally curved strips adapted to be inserted between the packing and the contiguous pipe wall to compress said packing to permit the two pipe members to be assembled, each of said strips having a small portion of one end thereof turned at an angle to the same.

9. An implement for coupling pipe containing compressible packing, consisting of a number of strips adapted to be inserted within the packing ring and to compress said packing into its recess to permit the introduction of the pipe into the packing ring, each of said strips having an enlargement at one end thereof so as to engage the surface of a removal collar.

10. An implement for coupling pipe containing compressible packing, consisting of a number of longitudinally curved strips adapted to be inserted within the packing ring and to compress said packing into its recess to permit the introduction of the pipe into the packing ring, each of said strips having an enlargement at one end thereof so as to engage the surface of a removal collar.

11. An implement for coupling pipe containing compressible packing, consisting of a plurality of strips adapted to be inserted between the packing and the contiguous pipe wall with their edges overlapping to compress said packing to permit the two pipe members to be assembled, said strips being also adapted to project from the joint to enable them to be withdrawn after the members are assembled.

12. An implement for coupling pipe containing compressible packing, consisting of a number of longitudinally curved strips adapted to be inserted within the packing ring so that their edges overlap and to compress said packing into its recess to permit the introduction of the pipe into the packing ring.

13. An implement for coupling pipe containing compressible packing, consisting of a plurality of strips of different lengths adapted to be inserted between the packing and the contiguous pipe wall to compress said packing to permit the two pipe members to be assembled, said strips being also adapted to project from the joint to enable them to be withdrawn after the members are assembled.

14. An implement for coupling pipe containing compressible packing, consisting of a plurality of longitudinally curved strips of different lengths adapted to be inserted between the packing and the contiguous pipe wall to compress said packing to permit the two pipe members to be assembled, said strips being also adapted to project from the joint to enable them to be withdrawn after the members are assembled.

15. An implement for coupling pipe containing compressible packing, consisting of a number of strips of different lengths adapted to be inserted within the packing ring and to compress said packing into its recess to permit the introduction of the pipe into the packing ring, and said strips at one end thereof bearing a boss constructed to engage the surface of a removal collar.

16. An implement for coupling pipe containing compressible packing, consisting of a number of longitudinally curved strips of different lengths adapted to be inserted within the packing ring and to compress said packing into its recess to permit the introduction of the pipe into the packing ring, and said strips at one end thereof bearing a boss constructed to engage the surface of a removal collar.

17. An implement for coupling pipe containing compressible packing, consisting of a plurality of strips adapted to be inserted between the packing and the contiguous pipe wall to permit the packing to be compressed and the two pipe members to be assembled, these strips being also adapted to project from the joint to enable them to be withdrawn after the members are assembled.

18. An implement for coupling pipe containing compressible packing, consisting of longitudinally inclined strips adapted to be inserted between the packing and the contiguous pipe wall, to enable the packing to be compressed and the two pipe members to be assembled, the strips being also adapted to project from the joint to enable them to be withdrawn after the members are assembled.

19. An implement for coupling pipe containing compressible packing, consisting of a plurality of strips adapted to be inserted between the packing and a contiguous pipe wall to enable the packing to be compressed and the two pipe members to be assembled, the strips having a small portion of one end thereof turned at an angle to the same.

20. An implement for coupling pipe containing compressible packing, consisting of a plurality of longitudinally inclined strips adapted to be inserted between the packing and the contiguous wall to enable the packing to be compressed and the two pipe members to be assembled, the strips having a small portion of one end thereof turned at an angle to the same.

In testimony whereof I have hereunto set my hand in presence of two subscribing witnesses, this nineteenth day of April, 1906.

DANIEL M. KENYON.

Witnesses:
  WILLIAM C. PURPLE,
  R. GOE.